United States Patent
Inukai

(10) Patent No.: US 8,104,063 B2
(45) Date of Patent: Jan. 24, 2012

(54) INFORMATION STORAGE APPARATUS, ITS CONTROL METHOD, AND STORAGE MEDIUM

(75) Inventor: Kyohei Inukai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 12/260,321

(22) Filed: Oct. 29, 2008

(65) Prior Publication Data

US 2009/0113485 A1  Apr. 30, 2009

(30) Foreign Application Priority Data

Oct. 31, 2007  (JP) ................................ 2007-283541

(51) Int. Cl.
 *H04N 7/173* (2011.01)
(52) U.S. Cl. ............... 725/94; 725/93; 725/92; 725/95; 386/86
(58) Field of Classification Search ............ 725/87, 725/93–95, 92; 386/86; 709/203
 See application file for complete search history.

(56) References Cited

U.S. PATENT DOCUMENTS

| 6,577,806 B1 | 6/2003 | Hirota |
| 6,886,029 B1 * | 4/2005 | Pecus et al. ................. 709/203 |
| 2003/0237085 A1 * | 12/2003 | Boston et al. .................... 725/1 |

FOREIGN PATENT DOCUMENTS

JP  2000-165788 A  6/2000

* cited by examiner

*Primary Examiner* — Hunter Lonsberry
(74) *Attorney, Agent, or Firm* — Carter, DeLuca, Farrell & Schmidt LLP

(57) ABSTRACT

An information storage apparatus for processing a plurality of broadcast contents, where each content is subject to a respective use condition, includes a storage unit for storing such contents, a control unit configured to manage a respective recording reservation of each content and to control the storage unit so as to store a reservation target content in the storage unit and delete a stored content from the storage unit, the reservation target content and the stored content being respective members of the plurality of broadcast contents, and a determination unit configured to determine, when an instruction to perform a recording reservation of the reservation target content is received, whether there is any content stored in the storage unit that, according to its use condition, is permitted to be deleted from the storage unit by a recording start time of the reservation target content.

7 Claims, 14 Drawing Sheets

FIG.3

| PARAMETER NAME | CONTENTS | BYTE LENGTH |
|---|---|---|
| VIEWING EXPIRATION TIME | EXPIRATION TIME OF VIEWING PERIOD (DATE, TIME, MINUTE, SECOND) | 5 BYTES |
| VIEWING PERIOD | VIEWABLE TIME FROM VIEWING START (SECOND) | 4 BYTES |
| NUMBER OF VIEWING TIMES | NUMBER OF PERMITTED VIEWING TIMES | 2 BYTES |
| NUMBER OF WRITING TIMES | NUMBER OF PERMITTED WRITING TIMES IN STORAGE APPARATUS WITH BUILT-IN REMOVABLE RECORDING MEDIUM/RECEIVER | 2 BYTES |

FIG.4

| PARAMETER NAME | CONTENTS | BYTE LENGTH |
|---|---|---|
| VIEWING START TIME | FIRST VEWING START TIME (DATE, TIME, MINUTE, SECOND) | 5 BYTES |
| NUMBER OF VIEWED TIMES | NUMBER OF VIEWED TIMES | 2 BYTES |
| NUMBER OF WRITTEN TIMES | NUMBER OF WRITTEN TIMES | 2 BYTES |

FIG.7

RESERVED PROGRAM: [AAA] JANUARY 15 19:00~20:00 (15GB)
YOU ARE RECOMMENDED TO DELETE THE FOLLOWING
PROGRAMS. DELETE PROGRAMS.

( DO NOT DELETE )

| PROGRAM NAME | USE CONDITION | DATA SIZE |
|---|---|---|
| BBB | EXPIRATION TIME | 1.7 GB |
| CCC | VIEWING PERIOD | 10 GB |
| DDD | NUMBER OF VIEWING TIMES | 5 GB |
| EEE | NUMBER OF WRITING TIMES | 15 GB |

| PROGRAM NAME | USE CONDITION | DATA SIZE |
|---|---|---|
| BBB | EXPIRATION DATE | 1.7 GB |
| CCC | VIEWING PERIOD | 10 GB |
| DDD | NUMBER OF VIEWING TIMES | 5 GB |
| EEE | NUMBER OF WRITING TIMES | 15 GB |

IT EXPIRES ON JANUARY 10. DELETE THIS CONTENT?
YES   NO

FIG.8B

| PROGRAM NAME | USE CONDITION | DATA SIZE |
|---|---|---|
| BBB | EXPIRATION DATE | 1.7 GB |
| CCC | VIEWING PERIOD | 10 GB |
| DDD | NUMBER OF VIEWING TIMES | 5 GB |
| EEE | NUMBER OF WRITING TIMES | 15 GB |

VIEWING PERIOD IS UNTIL JANUARY 11. DELETE THIS CONTENT?
YES   NO

FIG.8C

| PROGRAM NAME | USE CONDITION | DATA SIZE |
|---|---|---|
| BBB | EXPIRATION DATE | 1.7 GB |
| CCC | VIEWING PERIOD | 10 GB |
| DDD | NUMBER OF VIEWING TIMES | 5 GB |
| EEE | NUMBER OF WRITING TIMES | 15 GB |

NUMBER OF VIEWING TIMES IS LIMITED. DELETE THIS CONTENT?
YES   NO

FIG.8D

| PROGRAM NAME | USE CONDITION | DATA SIZE |
|---|---|---|
| BBB | EXPIRATION DATE | 1.7 GB |
| CCC | VIEWING PERIOD | 10 GB |
| DDD | NUMBER OF VIEWING TIMES | 5 GB |
| EEE | NUMBER OF WRITING TIMES | 15 GB |

IT HAS BEEN WRITTEN IN EXTERNAL RECORDING MEDIUM. DELETE THIS CONTENT?
YES   NO

INFORMATION STORAGE APPARATUS, ITS CONTROL METHOD, AND STORAGE MEDIUM

BACKGROUND OF THE INVENTION

1. Field of the Invention

The present invention relates to an information storage apparatus which receives and stores content distributed by broadcasting.

2. Description of the Related Art

Recent popularization of digital broadcasting increases demand for expansion of broadcasting services. One of such services may be a server-type broadcasting service.

The server-type broadcasting service is a system which enables a user to use various contents associated with broadcast programs by using a function of a home server (large-capacity storage apparatus for storing programs and various pieces of information provided via digital broadcasting or Internet according to viewer's preference) that is connected to not only digital broadcast programs but also the Internet.

The server-type broadcasting service uses a conditional access system for playback (CAS-P) as a conditional access system (CAS). In the conditional access system for playback, contents stored in an encrypted status in a storage unit of a receiver are decrypted during reproduction to enable a user to view and use the contents according to use conditions permitted by a provider who distributes the contents.

The server-type broadcasting service has a feature that broadcasts can be used in a form of a database or archives by providing broadcast contents as contents to a storage area in a server-type broadcast receiver owned by the user.

In the server-type broadcasting service, there is a demand for contents storage which effectively uses a limited storage area. Demand for the server-type broadcasting service and, together with an increase in data size caused by recent achievement of higher definition of digital broadcast contents, demand for a technology which efficiently uses the storage area by deleting unnecessary stored contents have increased.

As an example of efficiently using the storage area, Japanese Patent Application Laid-Open No. 2000-165788 discusses a digital broadcast receiving terminal apparatus which presets a threshold value of a set usable amount of a hard disk drive (HDD) at an end of recording of a program. The digital broadcast receiving terminal apparatus compares the usable amount with the threshold value to display a message indicating that a usable capacity is at a low level if it is detected that the usable amount is small, and simultaneously displays a value of the usable capacity when necessary. The digital broadcast receiving terminal apparatus sets expiration time of a recorded program and automatically deletes an expired program.

However, the digital broadcast receiving terminal apparatus of Japanese Patent Application Laid-Open No. 2000-165788 cannot delete a program yet to expire at a time of making a reservation of recording target contents, since the digital broadcast receiving terminal apparatus automatically deletes the stored contents only when the expiration time set for the programs passes. Consequently, contents that have expired by the recording start time are kept stored, and efficient use of the storage area cannot be achieved.

SUMMARY OF THE INVENTION

The present invention is directed to detection of a content which will become irreproducible or unnecessary at recording start time as a deletion candidate even if a use condition of the content is valid at the time of a recording reservation operation.

According to an aspect of the present invention, an information storage apparatus for processing a plurality of broadcast contents, wherein each content is subject to a respective use condition, includes a storage unit for storing such contents, a control unit configured to manage a respective recording reservation of each content and to control the storage unit so as to store a reservation target content in the storage unit and delete a stored content from the storage unit, the reservation target content and the stored content being respective members of the plurality of broadcast contents, and a determination unit configured to determine, when an instruction to perform a recording reservation of the reservation target content is received, whether there is any content stored in the storage unit that, according to its use condition, is permitted to be deleted from the storage unit by a recording start time of the reservation target content.

According to an exemplary embodiment of the present invention, even in a case of a stored content whose use condition is valid during a recording reservation operation, a content which will become irreproducible or unnecessary at recording start time can be detected as a deletion candidate.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates apart of a format of use conditions (rights management and protection information (RMPI)) included in a license stored in a receiver of server-type broadcasting.

FIG. 4 illustrates a use status included in the license stored in the receiver of the server-type broadcasting.

FIG. 7 illustrates a display example of deletion candidate contents according to the second exemplary embodiment.

FIGS. 8A to 8D illustrate display examples of deletion candidate contents according to the second exemplary embodiment.

DETAILED DESCRIPTION OF THE EMBODIMENTS

Various exemplary embodiments, features, and aspects of the invention are described in detail below with reference to the drawings. In the following description and the figures, like reference marks refer to like items. To avoid being redundant, description of the second through sixth embodiments focuses on their differences with respect to the first embodiment or other described embodiment.

Figure 1:
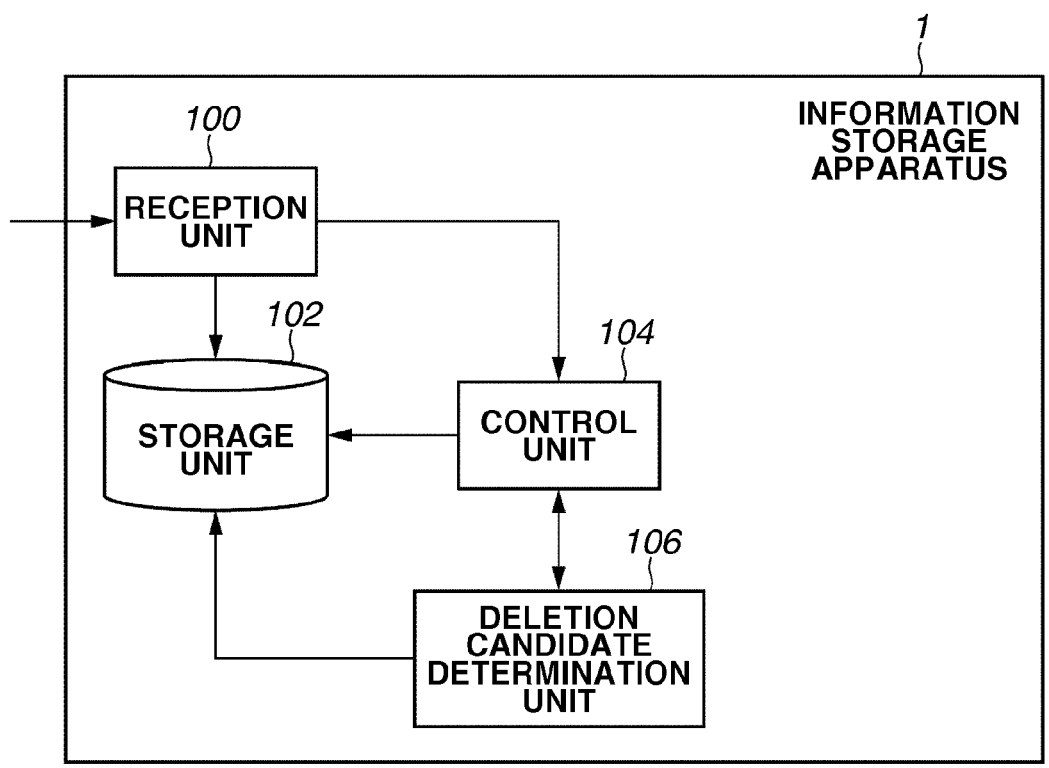
FIG. 1 illustrates a configuration example of an information storage apparatus according to a first exemplary embodiment of the present invention.

FIG. 1 illustrates a configuration example of an information storage apparatus 1 according to a first exemplary embodiment of the present invention. Main units of the information storage apparatus 1 will be described below. The information storage apparatus 1 may include other processing units.

In FIG. 1, a reception unit 100 includes a tuner, a demodulator, and a network interface for connection with an Internet line. The reception unit 100 receives digital broadcast data, program information and meta-data via the tuner, the demodulator, and the network interface. The reception unit 100 may include a function of receiving a recording reservation from a user. Additionally, the reception unit 100 may include a function of extracting data broadcasting and an electronic program guide (EPG) from the received data, and an access control function such as the conditional access system for playback.

A storage unit 102 includes a hard disk drive (HDD) and a memory, and stores a broadcast content (hereinafter, referred to as content) such as video data, audio data, the EPG, the meta-data, the program information and license information received by the reception unit 100.

A control unit 104 executes recoding of a content which the user has designated based on the EPG or an electronic content guide (ECG). When the content to be recorded is reserved, the control unit 104 manages information thereof, and performs control to record the content at the reserved time. Then, the control unit 104 deletes a content determined as a deletion candidate by a deletion candidate determination unit 106.

The deletion candidate determination unit 106 determines whether the content stored in the storage unit 102 can be deleted.

Figure 2:
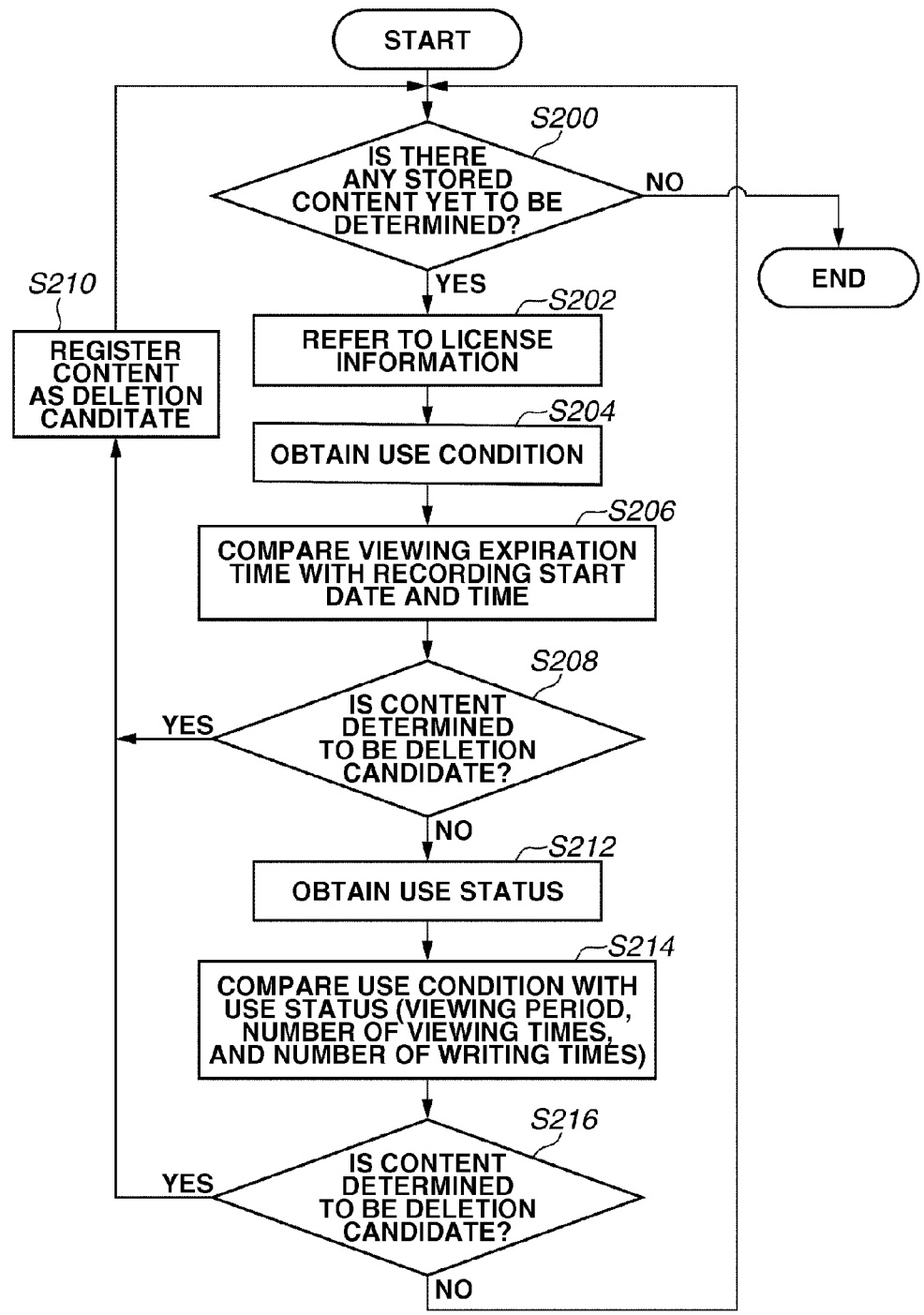
FIG. 2 is a flowchart illustrating deletion candidate determination processing according to the first exemplary embodiment.

FIG. 2 is a flowchart illustrating deletion candidate determination processing according to the present exemplary embodiment.

In step S200, the deletion candidate determination unit 106 determines whether there is any stored content yet to be determined as a deletion candidate in the storage unit 102. If there is the content yet to be determined (YES in step S200), the processing proceeds to step S202.

In step S202, the deletion candidate determination unit 106 refers to license information which is associated with the content of a determination target and stored in the storage unit 102. When the stored content is viewed, access control according to the conditional access system for playback can be performed by referring to the license information. In other words, viewing limitation information of the content can be obtained.

The license information does not need to be stored in the storage unit 102. For example, another storage unit for storing information (the license information and meta-data) other than the contents may be separately provided.

In step S204, the deletion candidate determination unit 106 obtains use conditions (RMPI) as the viewing limitation information from the license information that it refers to.

FIG. 3 illustrates apart of a format of items included in the use conditions used in the present exemplary embodiment, and parameters as the viewing limitation information will be described. Viewing expiration time indicates expiration time of a viewing period (date, time, minute and second) of the content. The viewing period indicates a viewable period (second) from when viewing of the content starts. A number of viewing times indicates a number of permitted viewing times of the content. A number of writing times indicates a number of permitted times of writing the content in a removable recording medium or a storage apparatus built in a receiver. A value of "0000h" indicates that the writing is not permitted.

In step S206, the deletion candidate determination unit 106 compares the viewing expiration time in the use conditions obtained from the stored content with a recoding start date and time of a reservation target content.

In step S208, if the stored content reaches the viewing expiration time before the recording start date and time (i.e., the stored content becomes invalid by the recording start time), the deletion candidate determination unit 106 determines the stored content to be the deletion candidate.

In step S210, the deletion candidate determination unit 106 registers the stored content which is the deletion candidate as a deletion candidate content.

On the other hand, in step S208, if the stored content reaches the viewing expiration time after the recording start date and time (i.e., the stored content is valid for the viewing expiration time at the recording start time), the deletion candidate determination unit 106 does not determine the stored content to be the deletion candidate.

In step S212, the deletion candidate determination unit 106 obtains a use status of the stored content to use viewing limitation information other than the viewing expiration time of the stored content in determining the deletion candidate.

The use status of the content is information about whether the content has been used (viewed) after storage of the content, and information holding its history if the content has been used.

FIG. 4 illustrates items included in the use status used in the present exemplary embodiment, and parameters as the viewing limitation information will be described. Viewing start time indicates first viewing start time (date, time, minute and second) of the stored content. The viewing period is set in the use conditions of the stored content. If the content is yet to be viewed, "0000h" is set. A number of viewed times indicates a number of viewed times of the stored content. In a case where the number of viewing times is not set in the use conditions of the stored content ("0000h"), or the content is yet to be stored while the number of viewing times is set in the use conditions, "0000h" is set. A number of written times indicates a number of written times of the stored content. In a case where the number of writing times is not set in the use conditions of the stored content ("0000h"), no writing has been carried out while the number of writing times is set in the use conditions, or the number of writing times is unlimited ("FFFFh"), "0000h" is set.

In step S214, the deletion candidate determination unit 106 compares the above described use conditions with each parameter of the use status.

In step S216, if the recording start date and time pass the viewing period in the use conditions from the viewing start time in the use status of the stored content (i.e., the stored content becomes invalid by the recording start time), the deletion candidate determination unit 106 determines the stored content to be the deletion candidate.

If the number of viewed times in the use status of the stored content is equal to or more than the number of viewing times in the use conditions, the deletion candidate determination unit 106 determines that the content is unnecessary since the content is not permitted to be viewed, and determines the content to be the deletion candidate. Further, if the number of written times of the use status is equal to or more than 1, the deletion candidate determination unit 106 determines that the content is unnecessary since the content has been stored outside, and determines the content to be the deletion candidate.

If the stored content is determined to be the deletion candidate (YES in step S216), in step S210, the deletion candidate determination unit 106 registers the content as the deletion candidate content, and returns to step S200 to retrieve a stored content yet to be determined. On the other hand, if the stored content is not determined to be the deletion candidate (NO in step S216), the deletion candidate determination unit 106 returns to step S200 to retrieve a stored content yet to be determined.

If there is no stored content yet to be determined in step S200 (NO in step S200), the deletion candidate determination processing is finished.

Thus, according to the present exemplary embodiment, even in the case of the stored content whose use conditions are valid during the recording reservation operation, the content which will become irreproducible or unnecessary by the recording start time can be detected as the deletion candidate.

The control unit 104 may automatically delete the stored content based on a determination result of the deletion candidate determination unit 106.

Next, referring to FIGS. 5 to 8D, a second exemplary embodiment of the present invention will be described.

In the present exemplary embodiment, deletion processing which is performed after a detected deletion candidate is presented to a user and deletion of an unnecessary content is approved is described.

Figure 5:
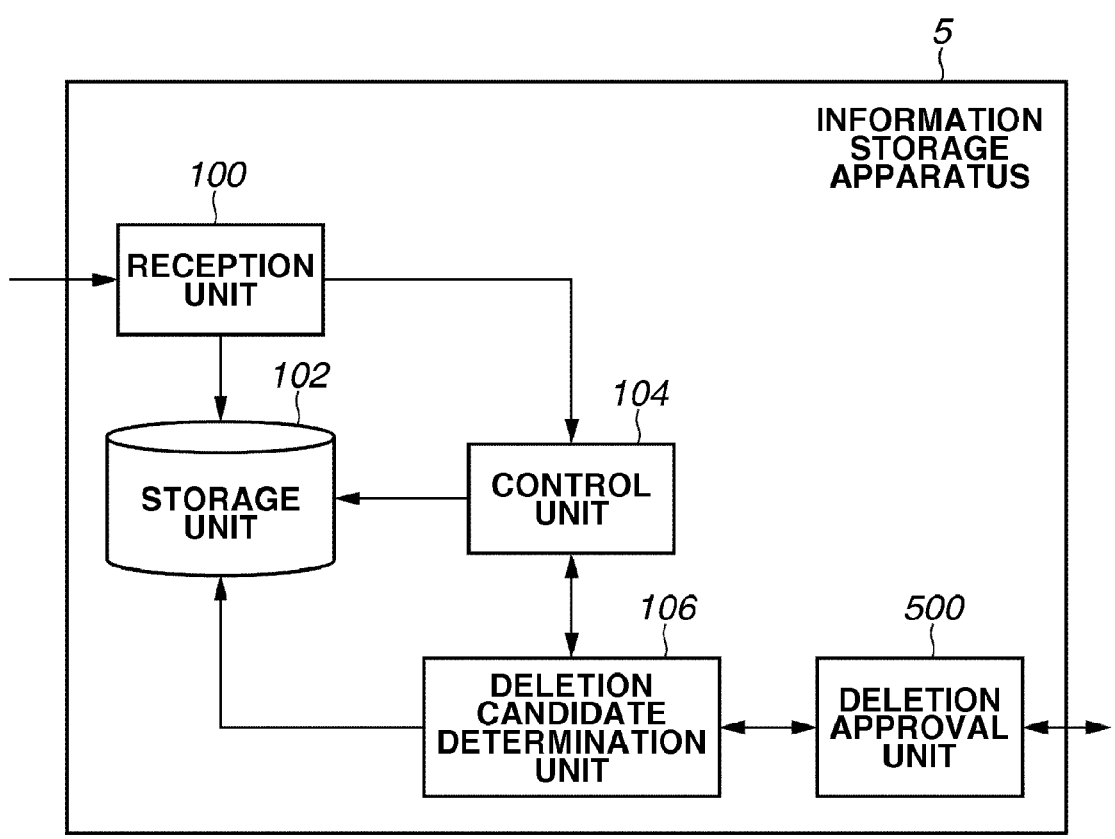
FIG. 5 illustrates a configuration example of an information storage apparatus according to a second exemplary embodiment of the present invention.

FIG. 5 illustrates a configuration example of an information storage apparatus according to the second exemplary embodiment. FIG. 5 corresponds to FIG. 1 of the first exemplary embodiment, and other processing units may be further added.

A basic configuration of an information storage apparatus 5 illustrated in FIG. 5 is similar to that of FIG. 1. The information storage apparatus 5 of the present exemplary embodiment further includes a deletion approval unit 500.

The deletion approval unit 500 indicates a deletion candidate content to the user to obtain approval of deletion execution. The deletion approval unit 500 displays the deletion candidate to a display apparatus (not shown) and an operation unit (not shown) externally connected to the information storage apparatus 5 to request for approval of deletion execution. The deletion approval unit 500 receives the reply to the request for approval, and instructs a control unit 104 to delete the content. The display apparatus and the operation unit may be integral with the information storage apparatus 5.

Figure 6:
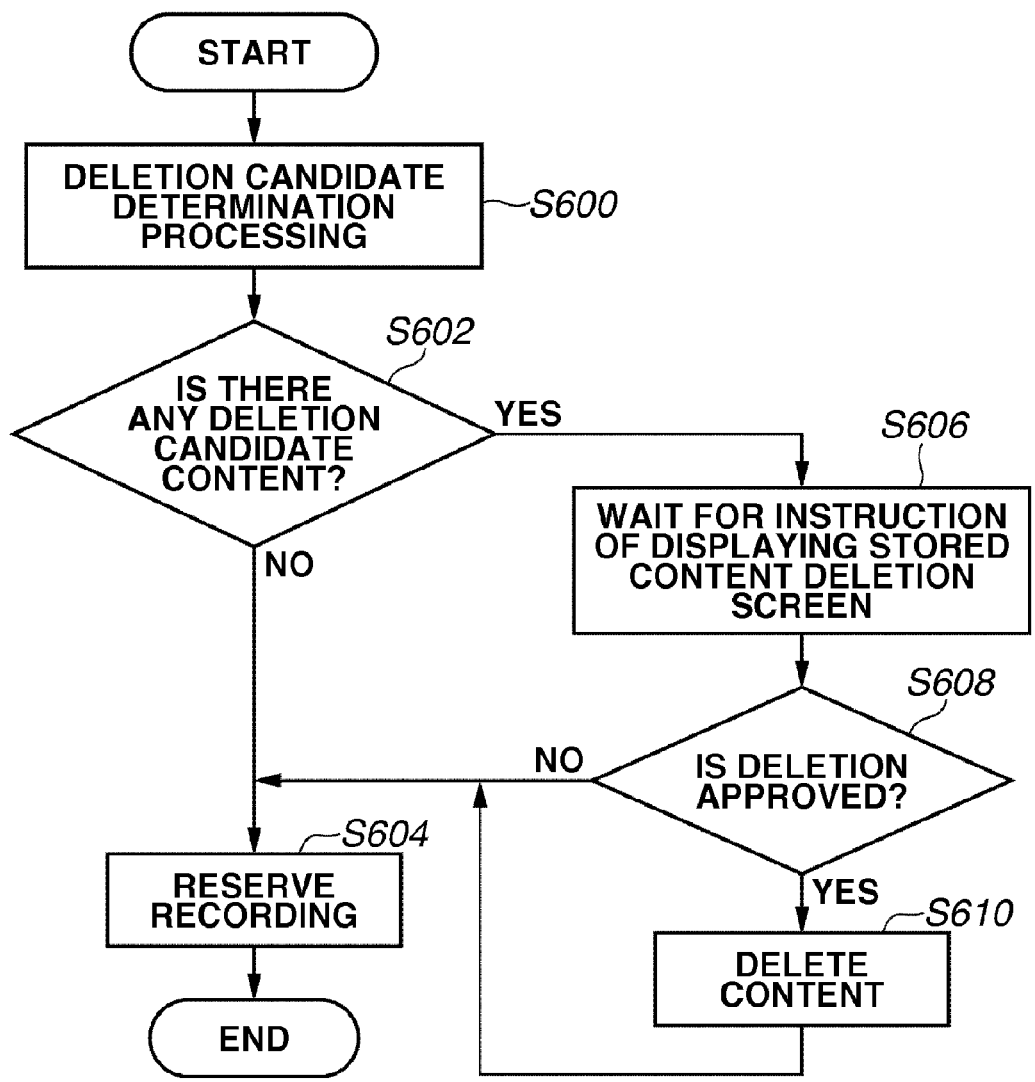
FIG. 6 is a flowchart illustrating processing during a recording reservation operation according to the second exemplary embodiment.

Next, referring to a flowchart of FIG. 6, processing during a recording reservation operation will be described.

In step S600, a deletion candidate determination unit 106 performs deletion candidate determination processing to detect a deletion candidate. The processing is similar to that of the flowchart of FIG. 2 that illustrates the first exemplary embodiment.

In step S602, the deletion candidate determination unit 106 determines, based on a determination result about all contents stored in a storage unit 102 in the deletion candidate determination processing of step S600, whether there is any content registered as the deletion candidate. If there is no deletion candidate content (NO in step S602), the processing proceeds to step S604 to execute normal recording reservation. If there is the deletion candidate content (YES in step S602), the processing proceeds to step S606 to execute processing of the deletion approval unit 500.

In step S606, the display apparatus or the operation unit displays a list of contents registered as the deletion candidates to the user. FIG. 7 illustrates an example of displaying.

A list 701 of FIG. 7 indicates the content of a user's reservation including a program name "AAA", program start and end date and time of 19:00 to 20:00 of Jan. 15, and a data size of 15 G bytes. A list of deletion candidates includes a program name, a use condition, and a data size of each candidate. In FIG. 7, the user selects a "DO NOT DELETE" button. When the user fixes the selection, in step S608 the deletion approval unit 500 determines that the deletion approval of the deletion candidate content cannot be obtained, and the processing proceeds to step S604 to reserve recording without executing any deletion processing. On the other hand, when the user selects a program name "BBB", as illustrated in FIG. 8A, expiration time that is the use condition of the program name "BBB" is indicated to be Jan. 10, which prompts the user to approve deletion of the content. The user selects and presses a "YES" button to give the deletion approval. When the user fixes the selection, in step S608 the deletion approval unit 500 determines that the deletion approval of the deletion candidate content is obtained, and the processing proceeds to step S610. In step S610, the control unit 104 deletes the program "BBB". Similarly, when the user selects a program name "CCC", as illustrated in FIG. 8B, a viewing period that is the use condition of the program name "CCC" is indicated to be until Jan. 11, which prompts the user to approve the deletion. When the user selects a program name "DDD", as illustrated in FIG. 8C, the number of viewing times that is the use condition of the program name "DDD" is indicated to have reached predetermined number of times. When the user selects a program name "EEE", as illustrated in FIG. 8D, as to the number of writing times that is the use condition of the program name "EEE" it is indicated that the program has been written in an external recording medium, which prompts the user to approve the deletion. In FIGS. 8B to 8D, as in the case of FIG. 8A, when the user selects and presses the "YES" button, in step S608 the deletion approval unit 500 determines that the deletion approval is obtained, and the processing proceeds to step S610 to delete the programs. When the user selects and presses a "NO" button, the processing returns to the display of FIG. 7.

In step S610, after execution of the deletion processing of the deletion-approved content, the processing proceeds to step S604 to reserve recording.

The list of deletion candidate contents may include other items in addition to the program name, the use condition, and the data size, or may include only an item such as the program name.

Thus, according to the present exemplary embodiment, deletion approval processing for the deletion candidate content which is detected in the first exemplary embodiment is performed so that even a content whose use condition is still valid can be deleted after obtaining approval from the user.

Next, referring to FIGS. 9 and 10, a third exemplary embodiment of the present invention will be described.

In the present exemplary embodiment, processing for prompting a user to update a license or to execute writing processing of a content which has not obtained deletion approval is described.

Figure 9:
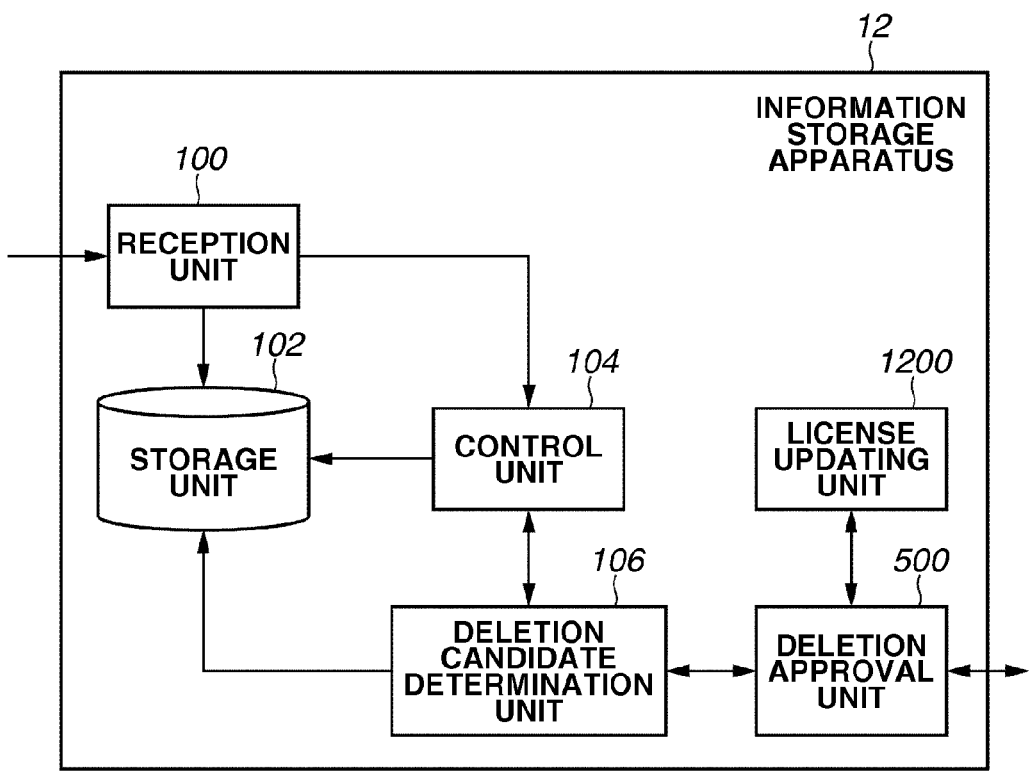
FIG. 9 illustrates a configuration example of an information storage apparatus according to a third exemplary embodiment of the present invention.
Figure 10:
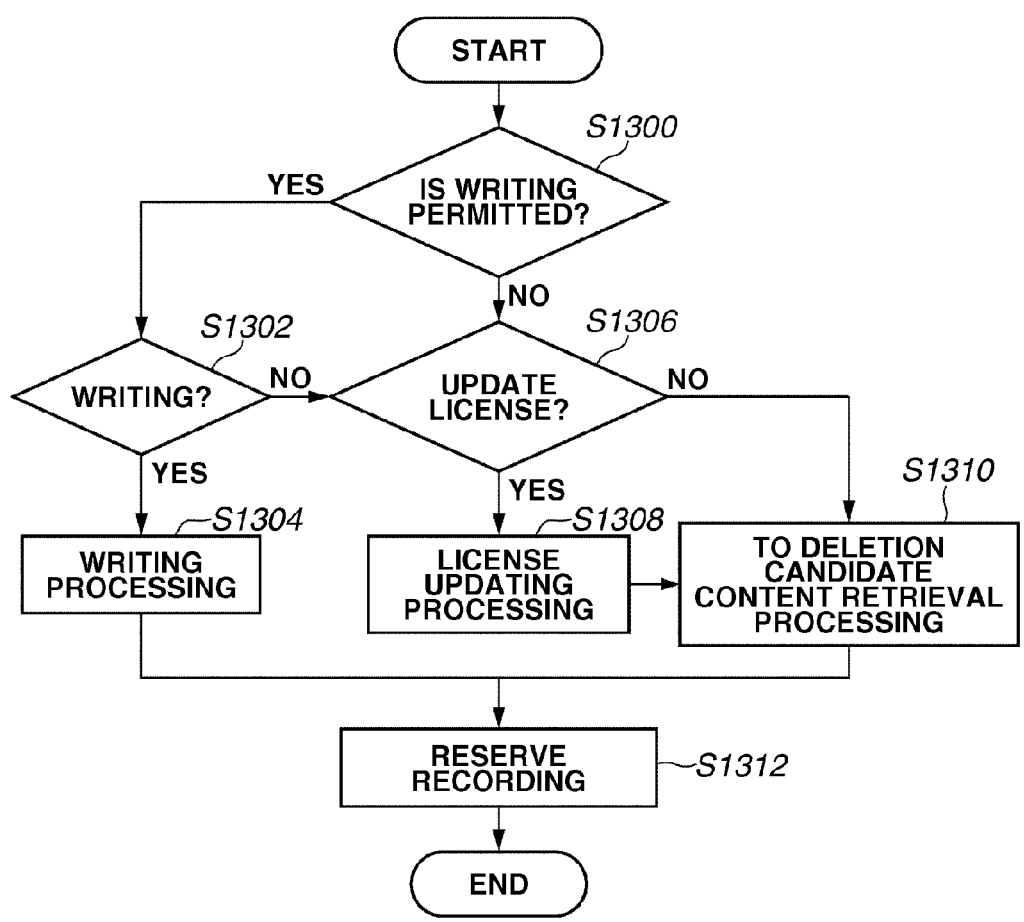
FIG. 10 is a flowchart illustrating processing when deletion approval is rejected according to the third exemplary embodiment.

FIG. 9 illustrates a configuration example of an information storage apparatus according to the third exemplary embodiment. FIG. 9 corresponds to FIGS. 1 and 5 of the first and second exemplary embodiments, and other processing units may be further added. A basic configuration of an information storage apparatus 12 illustrated in FIG. 9 is similar to those of FIGS. 1 and 5. The information storage apparatus 12 further includes a license updating unit 1200.

The license updating unit 1200 updates a license for a content stored in a storage unit 102.

Referring to a flowchart of FIG. 10, an operation performed in a case where no deletion approval is obtained during the recording reservation operation in the flowchart of FIG. 6 will be described.

In step S1300, the license updating unit 1200 checks whether a deletion candidate content which has not obtained the deletion approval can be written into an external recording medium. More specifically, the license updating unit 1200 refers to a use status and a use condition of the deletion candidate content. If the number of written times of the use status is less than the number of writing times of the use condition, the license updating unit 1200 determines that the deletion candidate content can be written. If the number of written times of the use status is equal to or more than the number of writing times of the use condition, the license updating unit 1200 determines that the deletion candidate content cannot be written. When it is determined that the deletion candidate content can be written (YES in step S1300), in step S1302, the license updating unit 1200 asks a user whether to write the deletion candidate content. If the user instructs to write the content (YES in step S1302), the processing proceeds to step S1304 to execute writing. Then, in step S1312, recording reservation processing is executed.

On the other hand, if it is determined in step S1300 that writing is not permitted (NO in step S1300), or if the user rejects writing in step S1302 (NO in step S1302), the processing proceeds to step S1306.

In step S1306, the license updating unit 1200 asks the user whether to update a license of the deletion candidate content. If the user instructs to update the license (YES in step S1306), in step S1308, the license updating unit 1200 updates the license of the deletion candidate content. More specifically, the license updating unit 1200 updates the license by a CAS card for controlling a conditional access which is included in a reception unit 100. The CAS card receives a license updating request from the license updating unit 1200 and data is communicated between the CAS card and a CAS server to realize the license updating processing. When the license updating processing is completed in step S1308, or when the user rejects license updating in step S1306 (NO in step S1306), processing proceeds to step S1310 wherein the deletion candidate content is retrieved and then to step S1312 wherein recording reservation processing is executed.

Thus, according to the present exemplary embodiment, even when no deletion approval is obtained for the deletion candidate content which is detected in the first and second exemplary embodiments, writing in the external recording medium or license updating can be performed. As a result, contents valuable for the user can be saved and updated without invalidating the license. As a consequence, convenience can be improved, and a storage area can be efficiently used.

Next, referring to FIGS. 11 and 12, a fourth exemplary embodiment of the present invention will be described.

According to the present exemplary embodiment, a user selects and decides timing of deleting a content which has obtained deletion approval.

Figure 11:
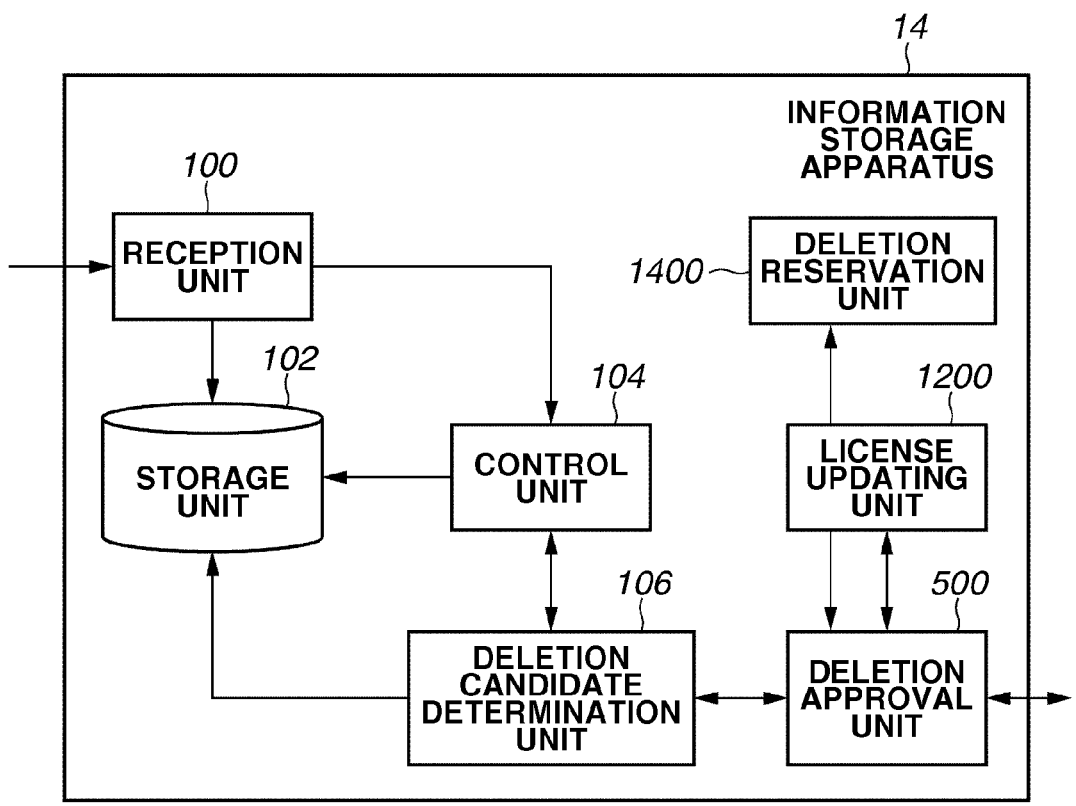
FIG. 11 illustrates a configuration example of an information storage apparatus according to a fourth exemplary embodiment of the present invention.

FIG. 11 is a functional block diagram illustrating a configuration example of an information storage apparatus 14 according to the fourth exemplary embodiment. FIG. 11 corresponds to FIGS. 1, 5 and 9 of the first to third exemplary embodiments, and other processing units may be further added. A basic configuration of the information storage apparatus 14 illustrated in FIG. 11 is similar to those of FIGS. 1, 5 and 9. The information storage apparatus 14 further includes a deletion reservation unit 1400.

The deletion reservation unit 1400 schedules deletion of a content permitted to be deleted in a deletion approval unit 500.

Figure 12:
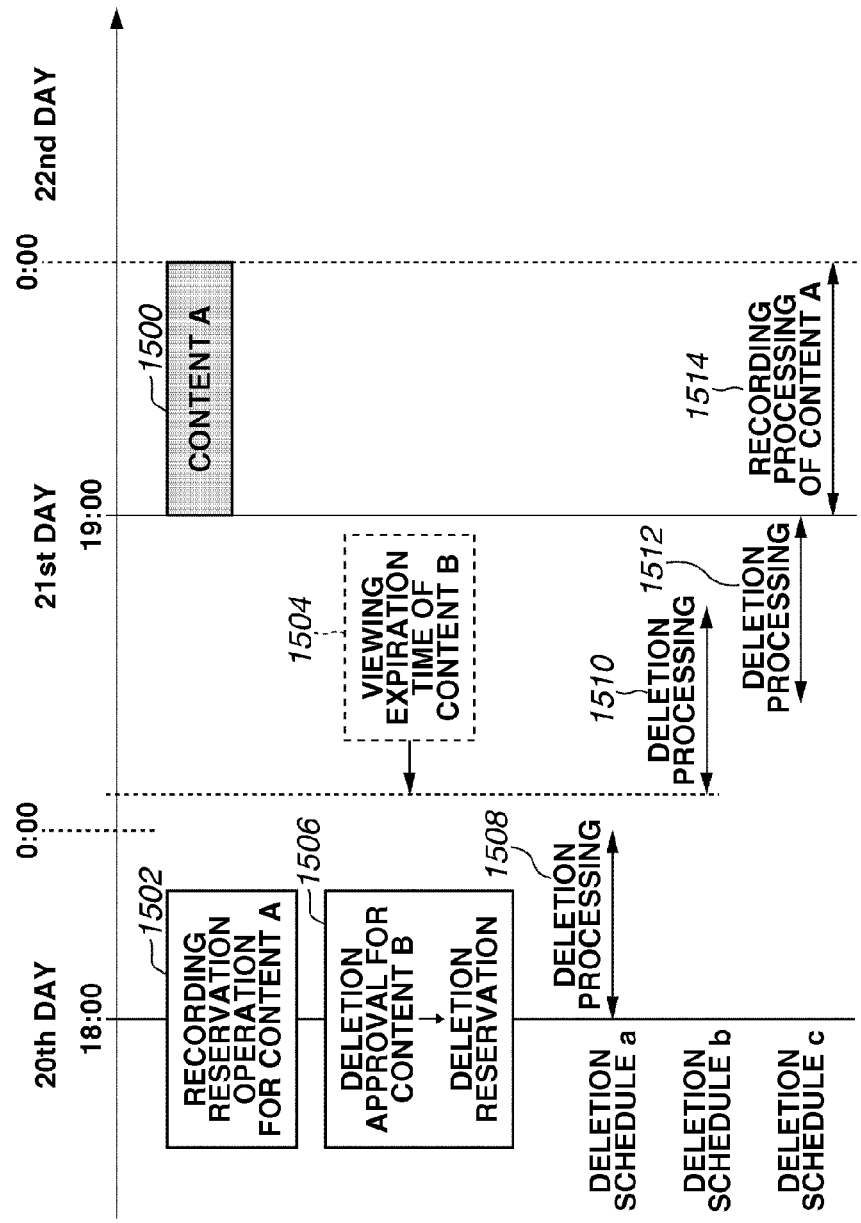
FIG. 12 is a diagram illustrating a deletion schedule according to the fourth exemplary embodiment of the present invention.

FIG. 12 illustrates an example of scheduling of deletion processing. As illustrated in 1500, broadcasting time of a program content A is 19:00 to 0:00 of 21st. In 1502, a user performs a recording reservation operation of the content A at 18:00 of 20th. It is presumed that a deletion candidate determination unit 106 detects a content B which will reach viewing expiration time on 21st as a deletion candidate (1504). Further, it is presumed that deletion approval is obtained from the user and deletion processing will be executed. Upon reception of the deletion approval, the deletion reservation unit 1400 makes a deletion reservation (1506) which sets a deletion schedule and thereafter executes further deletion reservation processing for the content B (1508 to 1512). The deletion reservation unit 1400 indicates the timing of executing the deletion processing 1508 to 1512 to the user, controls the information storage apparatus 14 to execute the deletion processing at the timing selected and decided by the user, and makes a reservation as to a deletion schedule. In other words, the deletion reservation unit 1400 executes the deletion processing immediately after the recording reservation operation (1508). Alternatively, the deletion reservation unit 1400 executes the deletion processing at a point of time when a viewing period of the content B expires (1510). Otherwise, the deletion reservation unit 1400 executes deletion processing (1512) immediately before execution of the recording of the content A (1514).

In a case of processing according to a deletion schedule a (1508), the deletion reservation unit 1400 executes the deletion processing immediately after the recording reservation operation. Thus, there is no problem regarding power management and deletion processing scheduling. On the other hand, in cases of processing according to deletion schedules b and c (1510 and 1512), the deletion reservation unit 1400 has to perform the deletion processing between the recording reservation operation and recording start processing. In these cases, a case needs to be assumed where main power of the information storage apparatus 14 is cut off. Thus, the information storage apparatus 14 includes, in the deletion reservation unit 1400, a timer function operable even when the power is cut off. The information storage apparatus 14 turns the main power on in synchronization with deletion timing by registering and counting the time of executing deletion processing to delete the content B.

Thus, according to the present exemplary embodiment, the content which has obtained the deletion approval among the deletion candidate contents detected in each of the first to third exemplary embodiments can be subjected to the deletion reservation and the deletion processing. As a result, content management can be realized as desired by the user. As a consequence, convenience can be improved, and a storage area can be efficiently used.

Figure 13:
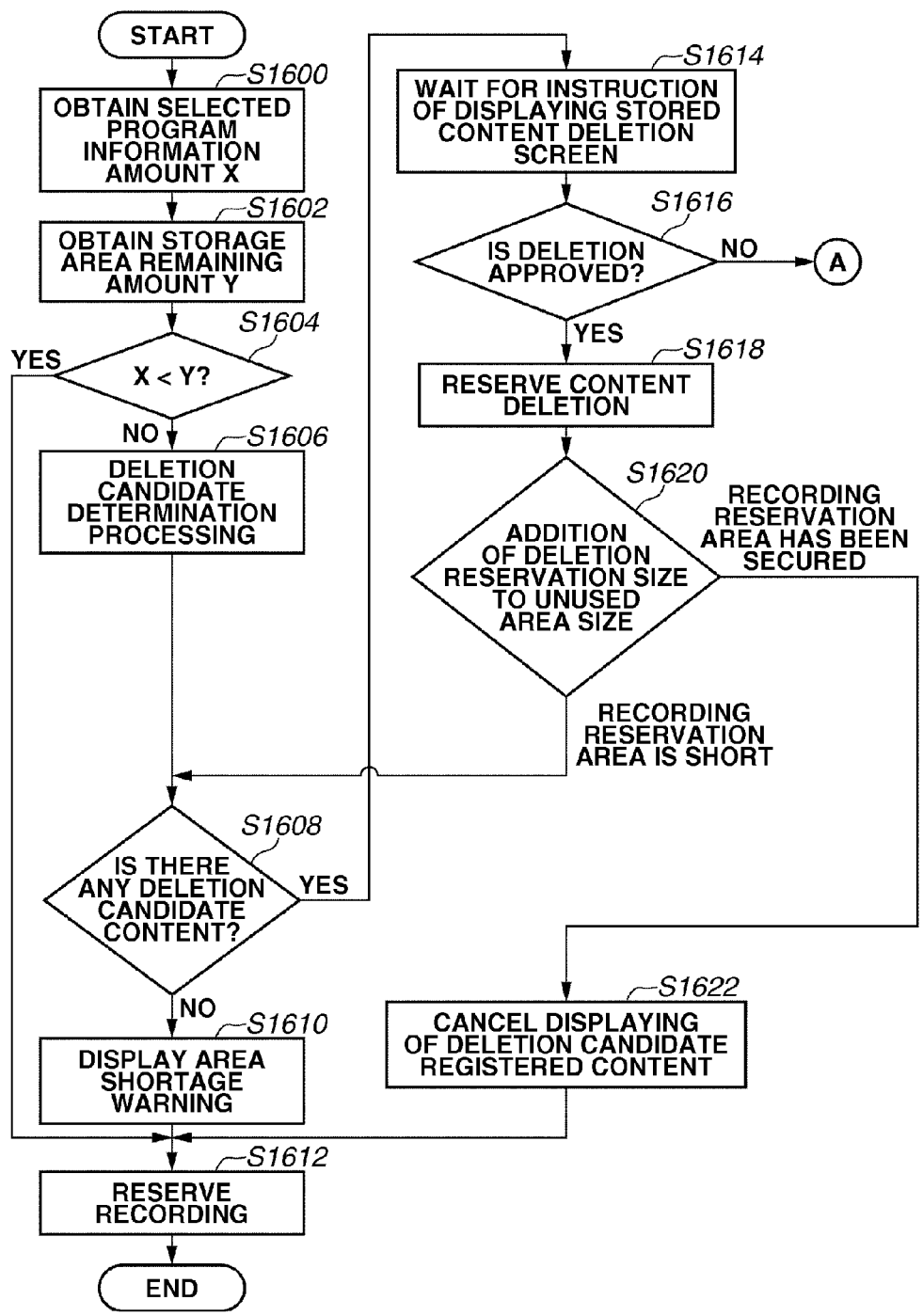
FIG. 13 is a flowchart illustrating a series of processing during a recording reservation operation according to a fifth exemplary embodiment of the present invention.

Next, referring to FIG. 13, a fifth exemplary embodiment of the present invention will be described.

According to the present exemplary embodiment, when there is a shortage of a storage area in a recording reservation operation, control is performed to secure the storage area.

A basic configuration of an information storage apparatus of the fifth exemplary embodiment is similar to those of the first to fourth exemplary embodiments of FIGS. 1, 5, 9 and 11. Other processing units may be added.

Referring to a flowchart of FIG. 13, processing performed during the recording reservation according to the fifth exemplary embodiment will be described.

When a user selects (and determines) a reservation target content, in step S1600, a control unit 104 obtains a data size X of the selected content. As an acquisition method for a server-type program TYPE I (stream type), the control unit 104 estimates an approximate data size based on a value of maximum_bitrate written in a digital copy control descriptor and event continuation time. For a server-type program TYPE II (file type), a data content descriptor provides a total capacity of the data in an event unit.

In step S1602, the control unit 104 calculates an unused area Y in a content storage area of a storage unit 102. The control unit 104 can calculate the value Y by recording an initial value of the content storage area and counting a total data size of a stored content.

In step S1604, the control unit 104 compares the values of X and Y with each other. In a case of X<Y (YES in step S1604), a storage area for the reserved content can be secured. Thus, in step S1612, the control unit 104 reserves recording and finishes the processing. On the other hand, in the case of X≧Y (NO in step S1604), namely if the storage area with the data size of the reserved content cannot be secured, the processing proceeds to step S1606.

In step S1606, a deletion candidate determination unit 106 executes the deletion candidate determination processing with respect to the stored content. Details of the processing are similar to those of the flowchart of FIG. 2.

In step S1608, the deletion candidate determination unit 106 determines, based on a result of the deletion candidate determination processing, whether there is any content registered as a deletion candidate. If there is no deletion candidate content (NO in step S1608), in step S1610, the deletion candidate determination unit 106 issues a warning about a shortage of the storage area to the user, and the control unit 104 reserves recording in step S1612 to finish the processing. In this case, the control unit 104 performs the deletion processing similar to that of the conventional case, for example, prioritizing recording of the reserved content, and deleting the stored content of oldest storage date and time. Alternatively, the control unit 104 may display a list of all stored contents to the user to forcibly prompt the user to select and determine a deletion content, and execute the deletion processing.

On the other hand, if there is the deletion candidate content (YES in step S1608), the processing proceeds to step S1614. The control unit 104 displays the deletion candidate content to the user and prompts the user to approve deletion. Examples of the display and the deletion approval processing are similar to those of FIG. 7 and FIGS. 8A to 8D.

Instep S1616, a deletion approval unit 500 determines whether deletion has been approved for any one of the deletion candidate contents. If no deletion approval has been obtained (NO in step S1616), the processing proceeds to processing A. Details of the processing A are similar to those of FIG. 10.

If it is determined in step S1616 that the deletion approval has been obtained (YES in step S1616), the processing proceeds to step S1618 to reserve content deletion. Details of the deletion reservation are similar to those of the deletion reservation of the fourth exemplary embodiment.

In step S1620, the control unit 104 regards a data size of the content reserved for deletion in step S1618 as an unused area at the recording start time and adds it to the current unused area Y. If the added size is equal to or more than the data size of the reservation target content, it means that the storage area has been secured. Thus, the processing proceeds to step S1622, and the control unit 104 cancels the display of the deletion candidate content, reserves recording, and then finishes the processing.

On the other hand, if a value obtained by adding the data size of the content reserved for deletion to the unused area Y is still equal to or less than the data size of the reservation target content, it means that no sufficient storage area has been secured. Thus, returning to step S1608, a series of deletion processing such as displaying and deletion of the deletion candidate content is performed again.

Therefore, according to the present exemplary embodiment, when there is a shortage of a storage area for reserved contents in the recording reservation operation, deletion approval and deletion reservation can be performed until the storage area is secured by displaying a list of deletion candidate contents. As a result, convenience can be improved and the storage area can surely be secured.

Figure 14:
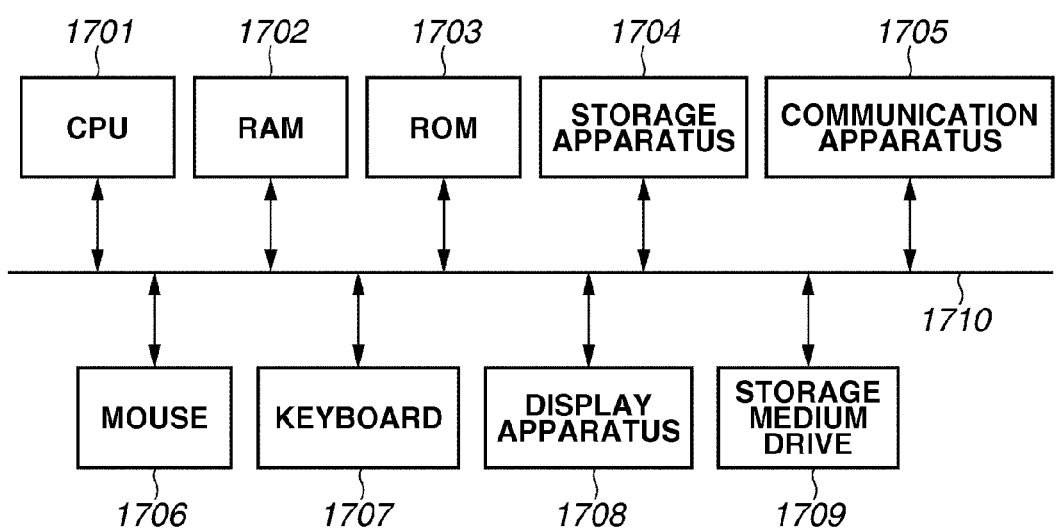
FIG. 14 illustrates a configuration example of a data processing apparatus according to a sixth embodiment of the present invention.

In a sixth exemplary embodiment, the present invention applied as an example to a data processing apparatus (e.g., host computer) illustrated in FIG. 14 is described.

FIG. 14 illustrates a basic configuration of the data processing apparatus of the present exemplary embodiment. A central processing unit (CPU) 1701 performs overall control of the apparatus by using a program and data stored in a random access memory (RAM) 1702 and a read-only memory (ROM) 1703. The RAM 1702 includes an area for temporarily storing a program and data loaded from a storage apparatus 1704 and a storage medium drive 1709, and image data input from an image input apparatus (not shown). The RAM 1702 temporarily stores data received from an external apparatus via a communication apparatus 1705. The RAM 1702 also includes a work area used by the CPU 1701 for executing various processing. The ROM 1703 stores a control program and a boot program for the entire apparatus, or setting data of the apparatus. The storage apparatus 1704 such as a hard disk can save a program and data loaded from the storage medium drive 1709. When a size of the work area exceeds that of the RAM 1702, an area equivalent to the excess size can be provided as a file.

A mouse 1706 and a keyboard 1707 can function as pointing devices to input various instructions to the apparatus. A display apparatus 1708 includes a cathode ray tube (CRT) and a liquid crystal screen, and can display image and character information. The storage medium drive 1709 includes a compact disc-read only memory (CD-ROM) drive, a digital versatile disc-read only memory (DVD-ROM) drive, and a floppy disk (FD) drive, and can read a program and data from a storage medium such as a CD-ROM, a DVD-ROM and a FD. The communication apparatus 1705 is connected to the external apparatus via Internet so that it can transfer and receive data. A bus 1710 interconnects these units and apparatuses.

In the present exemplary embodiment, a reception unit 100 corresponds to the communication apparatus 1705, and a storage unit 102 corresponds to the storage apparatus 1704. The CPU 1701 executes processing in a control unit 104, a deletion candidate determination unit 106, a deletion approval unit 500, a license updating unit 1200, and a deletion reservation unit 1400 so that the present invention can be implemented by the data processing apparatus of the present exemplary embodiment.

The present invention may be applied as a part of a system which includes a plurality of devices, or a part of an apparatus which includes one device.

The present invention is not limited to the apparatus or the methods for realizing the above exemplary embodiments.

For example, supplying of program codes of software for realizing the exemplary embodiments to a computer (CPU or micro processing unit (MPU)) in the system or the apparatus is also within the invention. The computer of the system or the apparatus operates various devices according to the computer program to realize the exemplary embodiments. This case is also included in the present invention.

In this case, the computer program itself realizes functions of the exemplary embodiments. In other words, the computer program itself, and a unit for supplying the computer program to the computer, specifically, a storage medium for storing the computer program are also included in the present invention.

As such a storage medium for storing the computer program, a hard disk, an optical disk, a magneto-optical disk, a CD-ROM, a DVD, a magnetic tape, a nonvolatile memory card, and a ROM can be used.

The present invention is not limited to realization of the functions of the above exemplary embodiments by controlling various devices only according to the computer program. For example, a case where the computer program cooperates with an operating system (OS) running on the computer or other application software to realize the exemplary embodiments is also included in the present invention.

Further, a case where, based on an instruction of the computer program stored in a memory in a function expansion board inserted into the computer, a CPU of the function expansion board performs a part or all of actual processing is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-283541 filed Oct. 31, 2007, which is hereby incorporated by reference herein in its entirety.

What is claimed is:

1. An information storage apparatus, comprising:
   a storage unit for storing a plurality of broadcast contents, each broadcast content subject to at least one use condition including a viewing expiration time;
   a control unit configured to store a recording reservation of a target broadcast content in the storage unit and to delete a stored broadcast content from the storage unit; and
   a determination unit configured to determine, when an instruction to perform the recording reservation of the target broadcast content is received, whether the stored broadcast content is permitted to be deleted from the storage unit based upon a comparison of the viewing expiration time of the stored broadcast content and a recording start time of the target broadcast content.

2. The information storage apparatus according to claim 1, wherein the determination unit determines that the stored broadcast content is permitted to be deleted when the viewing expiration time of the stored broadcast content is before the recording start time of the target broadcast content.

3. The information storage apparatus according to claim 1, wherein the determination unit is further configured to determine whether deletion of the stored broadcast content is permitted based on a comparison of the at least one use condition and a status of the stored broadcast content.

4. The information storage apparatus according to claim 1, wherein the determination unit is further configured to determine whether deletion of the stored broadcast content is permitted based on a comparison of a data size of the target broadcast content and an unused area of the storage unit.

5. The information storage apparatus according to claim 1, further comprising a display unit configured to display a content determined to be a deletion candidate by the determination unit.

6. A method of information storage, the method comprising:
   managing a plurality of stored broadcast contents, each broadcast content subject to at least one use condition including a viewing expiration time;
   storing a recording reservation of a target broadcast content; and
   determining, when an instruction to perform the recording reservation of the target broadcast content is received, whether the stored broadcast content is permitted to be deleted based upon a comparison of the viewing expiration time of the stored broadcast content and a recording start time of the target broadcast content.

7. A storage medium that stores a computer program for storing information, the computer program comprising:
   program code for managing a plurality of stored broadcast contents, each broadcast content subject to at least one use condition including a viewing expiration time;
   program code for storing a recording reservation of a target broadcast content; and
   program code for determining, when an instruction to perform the recording reservation of the target broadcast content is received, whether the stored broadcast content is permitted to be deleted, based upon a comparison of the viewing expiration time of the stored broadcast content and a recording start time of the target broadcast content.

* * * * *